United States Patent [19]
Samuelson et al.

[11] B 3,985,192

[45] Oct. 12, 1976

[54] ENGINE AND DRIVE TRAIN SUSPENSION SYSTEM FOR SNOWMOBILES

[75] Inventors: Donald G. Samuelson, Anoka; Charles A. Baxter, Minneapolis, both of Minn.

[73] Assignee: Textron, Inc., Providence, R.I.

[22] Filed: Aug. 21, 1974

[21] Appl. No.: 499,171

[44] Published under the second Trial Voluntary Protest Program on January 27, 1976 as document No. B 499,171.

[52] U.S. Cl. ................................. 180/5 R; 180/59
[51] Int. Cl.² ........................................ B62M 27/02
[58] Field of Search .............. 180/5 R, 11, 12, 59, 180/61

[56] References Cited
UNITED STATES PATENTS

| | | | |
|---|---|---|---|
| 1,068,883 | 7/1913 | Frank | 180/5 R |
| 3,756,334 | 9/1973 | Williams | 180/5 R |
| 3,794,131 | 2/1974 | Freedman | 180/5 R |
| 3,822,755 | 7/1974 | Hine | 180/5 R |

*Primary Examiner*—Philip Goodman
*Attorney, Agent, or Firm*—Merchant, Gould, Smith, Edell, Welter & Schmidt

[57] ABSTRACT

An improved snowmobile construction in which the entire power train from engine to track drive member is rigidly mounted in bearings in a cradle member, and the latter is resiliently mounted on the housing of the snowmobile. In one embodiment the snowmobile skis are also mounted on the cradle member. In a second embodiment the skis are mounted on the housing, and the forward portion of the cradle is additionally interconnected resiliently with the housing.

15 Claims, 5 Drawing Figures

ENGINE AND DRIVE TRAIN SUSPENSION SYSTEM FOR SNOWMOBILES

BACKGROUND OF THE INVENTION

This invention relates to snowmobiles, and particularly to the power trains thereof. In the past it has been customary to mount the track drive member of the vehicle rigidly in bearings on the vehicle housing, and similarly to mount the various power transmission elements such as the chain case and the drive pulley of the centrifugal clutch rigidly on the housing. The engine in such cases has been resiliently mounted on the housing to in some degree reduce the vibration inherent in such devices and isolate it from the driver. This expedient only partially accomplished its isolation purpose, and added problems of reliability, since with so many mechanical elements mounted on the housing the question of initially obtaining and permanently maintaining a tolerable condition of alignment therebetween becomes very great.

SUMMARY OF THE INVENTION

The present invention has for its purpose to reduce noise and vibration in snowmobiles, and increase their ease of construction and permanence of mechanical alignment. These advantages are obtained by mounting the entire power train of the vehicle, from engine to track drive member, rigidly in bearings in a cradle member: the cradle member is in turn resiliently mounted on the vehicle housing. The resilient mounting comprises a pair of discs of resilient material located coaxially with the track drive member and having first surfaces secured to the housing and second surfaces secured to the cradle member. If desired, additional resilient interconnections between the housing and the cradle member may be provided. The skis of the vehicle may be secured either to the housing or to the cradle member at the designer's preference.

It is accordingly a primary object of the invention to provide an improved snowmobile. Another object is to improve the drive train of such a vehicle so that it is more easily constructed and permanently aligned, and so that vibration transmitted to the user, as well as noise output, are considerably reduced. A more specific object of the invention is to provide such a vehicle in which all elements of the power train, from engine to track drive member, are rigidly mounted in bearings in a cradle member, and the latter is carried in the housing in resilient fashion. Another specific object is to provide means for interconnecting a snowmobile housing with a power train cradle member, as just described, by use of a pair of resilient discs having first surfaces secured to the housing and second surfaces secured to the cradle member, the discs being located coaxially with the track drive member.

Various other objects, advantages, and features of novelty which characterize our invention are pointed out with particularly in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

DESCRIPTION OF THE PREFERRED EMBODIMENTS

Figure 1:
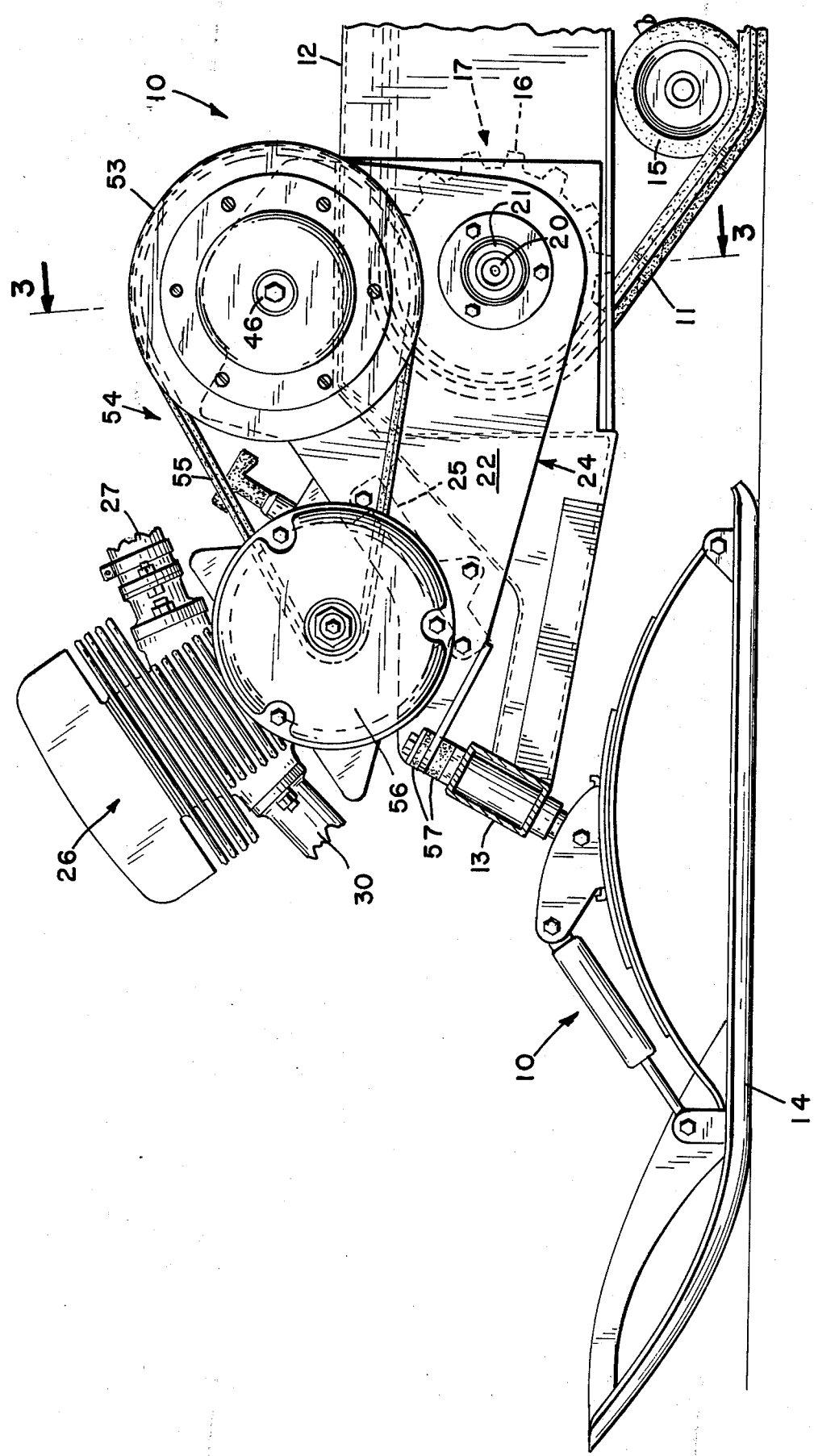
FIG. 1 is a partial view of a snowmobile embodying the invention seen from the left side, the left ski member being broken away.
Figure 2:
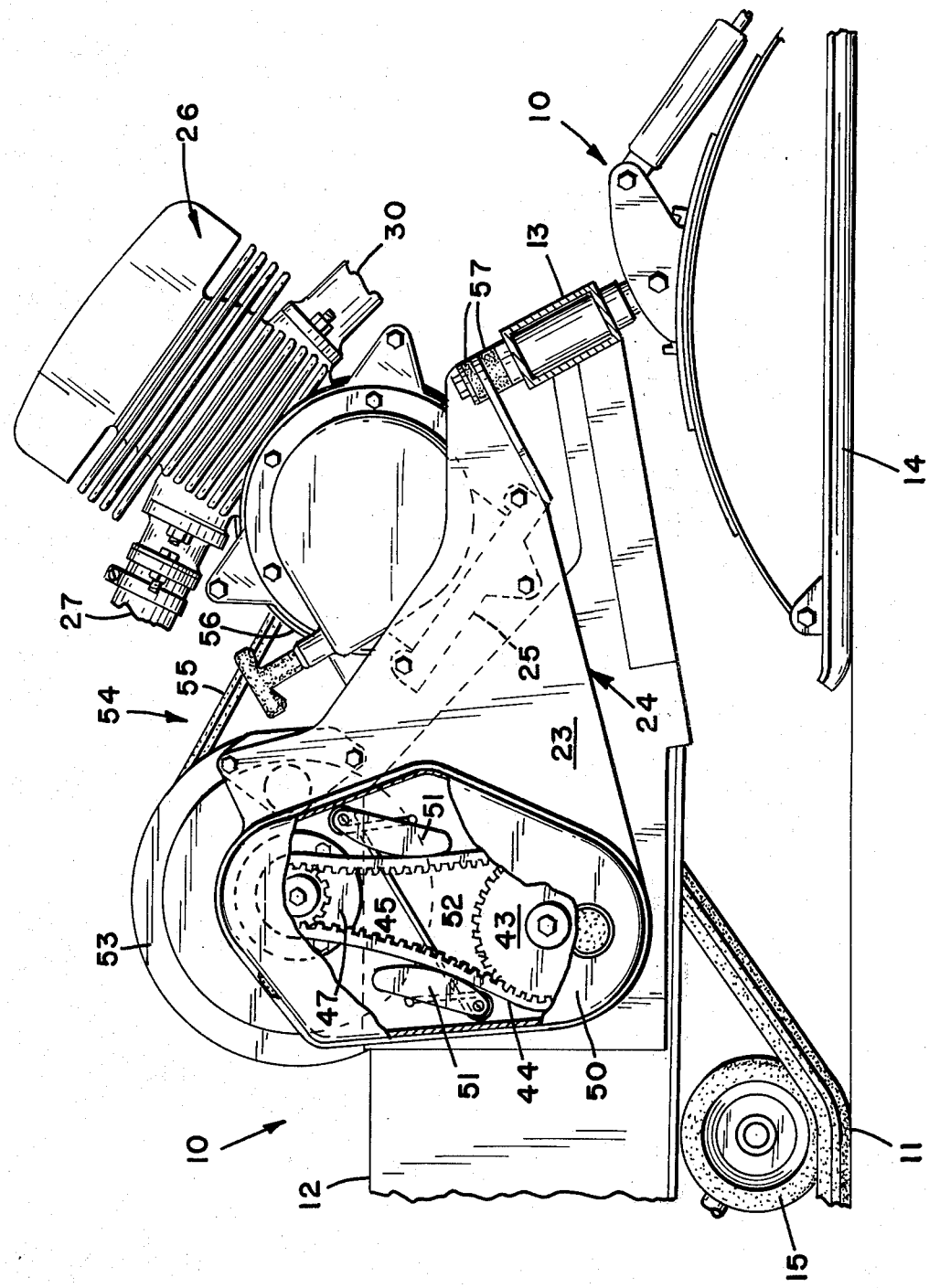
FIG. 2 is a similar view from the right.
Figure 3:
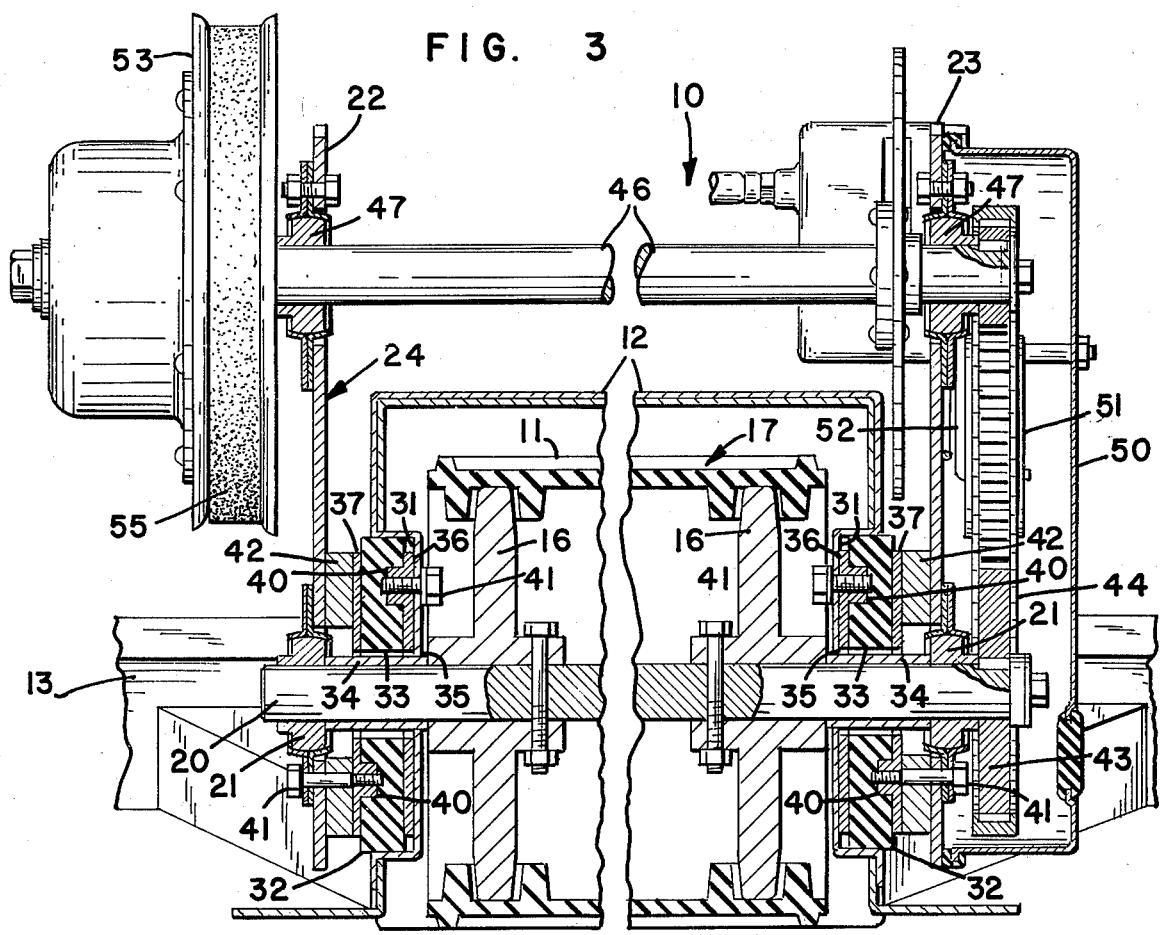
FIG. 3 is a sectional view along the line 3—3 of FIG. 1.
Figure 4:
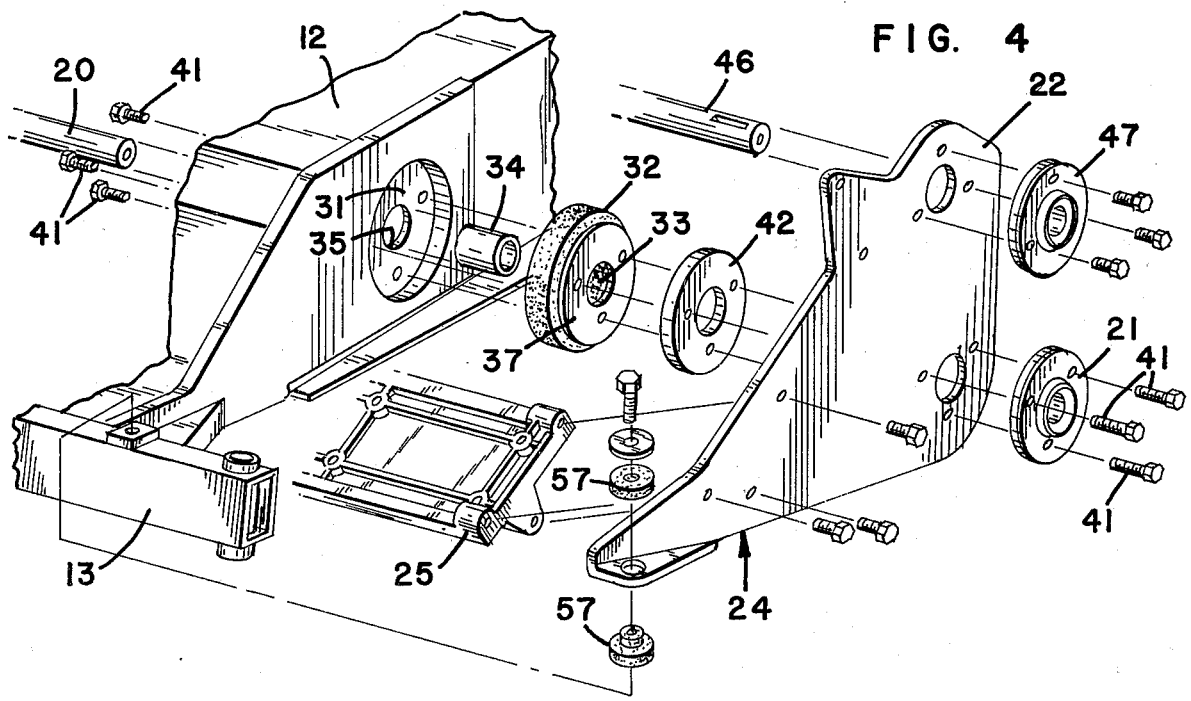
FIG. 4 is an exploded detail view.

A first embodiment of our invention is shown in FIG. 1 to comprise a snowmobile 10 having a drive track 11 enclosed in a housing 12 with a front cross member 13 to which are pivoted a pair of steerable ski members, the right hand one of which is shown at 14. Track 11 runs on bogies such as 15, around an idler not shown, and is driven by sprocket-like elements 16 of a track drive member 17.

Elements 16 are fixed on a shaft 20 which is rigidly mounted in bearings 21, carried not by housing 12 but by the plates 22 and 23 of a cradle member 24 having a transverse engine mounting plate 25. A gasoline engine 26 with the usual throttle and carburetor, not shown, is rigidly secured to plate 25. The combustible mixture of air and gasoline is supplied to the engine at 27, and combustion products are led away at 30.

The sides of housing 12 are recessed at 31 to receive a pair of discs 32 of resilient material having central apertures 33 larger in diameter than a pair of spacing sleeves 34 which surround shaft 20 and prevent axial play of the shaft in bearings 21: the centers of recesses 31 have similar openings 35. Each disc 32 has a first metal plate 36 vulcanized to its inner surface and a second metal plate 37 vulcanized to its outer surface. The plates have internally threaded members 40 secured thereto within the body of the resilient discs, to receive bolts 41 which do not pass completely through the resilient discs. By this arrangement one face of each disc is secured to housing 12, and the other face is secured to one of the side plates of cradle member 24, spacers 42 being supplied if necessary.

Keyed to the right hand end of shaft 20 is a driven sprocket wheel 43, connected by a chain 44 with a drive sprocket wheel 45 carried on a jack shaft 46 mounted rigidly in bearings 47 in cradle 24. A chain case 50 covers and protects the sprockets and chain, and may also include means 51 actuated by a suitable spring 52 for maintaining adequate tension in chain 44.

Jack shaft 46 carries the driven pulley 53 of a centrifugal clutch 54 including a belt 55 and a driving pulley 56. An arrangement suitable for this use is taught in reissue U.S. Pat. No. 27,858 issued on Jan. 1, 1974 to Eugene W. Laughlin. Drive pulley 56 is carried on the shaft of engine 26, and the engine is securely bolted to plate 25. It is thus apparent that the entire power train, from engine 26 to drive member 17, is rigidly secured, in proper bearings, to cradle 24, so that disalignment of the various shafts is most unlikely.

The forward ends of cradle member 24 are interconnected by resilient joints 57 with the housing of the vehicle, thus additionally limiting any movement of cradle member 24 with respect to housing 12 about the axis of shaft 20.

Figure 5:
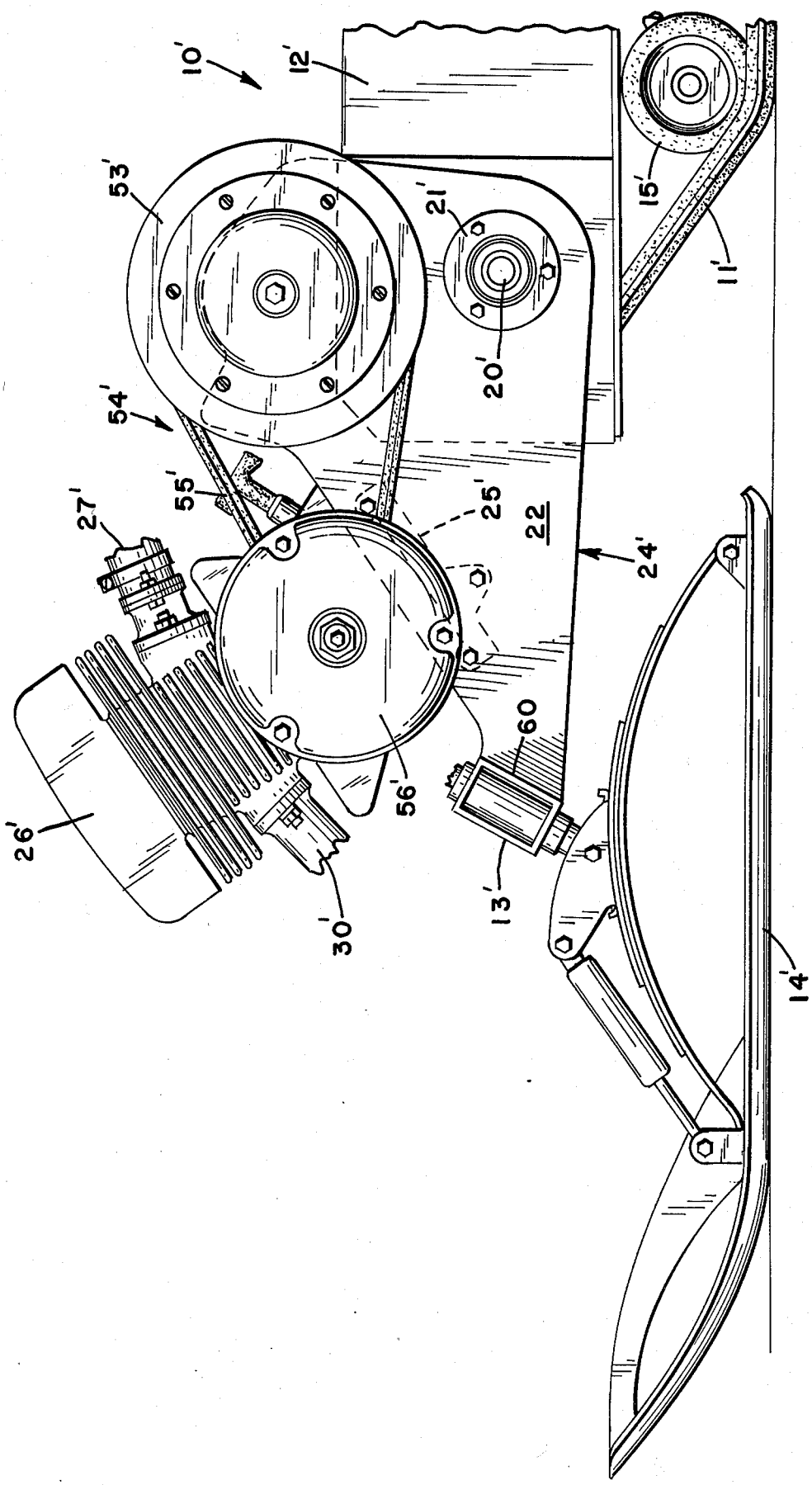
FIG. 5 is a partial left side view of a second embodiment of the invention.

The embodiment of the invention shown in FIG. 5 is generally the same as described above, and like parts are given the same reference numerals with a prime suffix: it differs from that described in two respects. In the first place the forward portion of the housing, and the resilient mounts 57, are both omitted. In the second place the ski members 14' are mounted on the modified cradle member 24', at 60, rather than on the housing. By this arrangement any vibration of the cradle member is in part transmitted to the surface on which the vehicle is moving, thus decreasing the amount required to be dissipated in the resilient discs.

From the foregoing it will be evident that we have invented an improved snowmobile, the improvement comprising in part an improved power train mounting whereby the entire power train is rigidly mounted in bearings in a cradle member, and the latter is resiliently mounted on the vehicle housing.

Numerous objects and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim as our invention:

1. In a snowmobile including a rearward track and forward ski members:
   a housing enclosing said track;
   a track drive member passing through said housing;
   a source of mechanical energy of rotation coupled to said drive member external to said housing;
   and cradle means including a pair of spaced rigid plate members resiliently mounting said source and said drive member on said housing.

2. The structure of claim 1 in which said ski members are secured to said housing.

3. The structure of claim 1 in which said ski members are secured to said cradle member.

4. The structure of claim 1 in which said source is rigidly mounted in bearings on said cradle.

5. In a snowmobile including a rearward track and forward ski members;
   a housing enclosing said track;
   a track drive member passing through said housing;
   a source of mechanical energy of rotation coupled to said drive member external to said housing;
   and cradle means resiliently mounting said source and said drive member on said housing, said cradle means including discs of resilient material coaxial with the drive member, and means securing the opposite faces of each disc to said housing and cradle respectively.

6. The structure of claim 5 including means remote from said discs for further resiliently interconnecting said housing and said cradle.

7. The structure of claim 5 in which said discs comprise the only mechanical connection between said cradle member and said housing.

8. In a snowmobile including a rearward track enclosed in a housing and forward ski members, in combination:
   an engine having a throttle to vary the speed thereof;
   a jack shaft;
   centrifugal clutch means transmitting power from said engine to said jack shaft;
   a track drive member passing through the housing;
   a chain drive enclosed in a chain case and transmitting power from said jack shaft to said track drive member;
   a cradle member;
   means rigidly supporting said engine, said jack shaft, and said drive member in bearings in said cradle member;
   and means resiliently supporting said cradle member on said housing, including a pair of discs of resilient material having first faces secured to said housing and second faces secured to said cradle member.

9. The structure of claim 8 in which said discs are located coaxially with said drive member.

10. The structure of claim 8 in which said discs comprise the only mechanical connection between said cradle member and said housing.

11. The structure of claim 8 in which said ski members are connected to said cradle member.

12. The structure of claim 8 including means remote from said discs for further resiliently interconnecting said housing said cradle member.

13. In a snowmobile including a rearward track and forward ski members:
   a housing enclosing said track;
   a track drive member passing through said housing;
   a source of mechanical energy of rotation coupled to said drive member external to said housing:
   and cradle means resiliently mounting said source and and said drive member on said housing, said cradle means including first and second spaced rigid plate members and a rigid engine mount interconnecting said plate members.

14. The structure of claim 13 in which said ski members are secured to said plate members at forward portions thereof.

15. The structure of claim 13 in which said plate members are resiliently interconnected with said housing at forward portions thereof.

* * * * *